(12) United States Patent
Davis et al.

(10) Patent No.: US 12,441,413 B2
(45) Date of Patent: Oct. 14, 2025

(54) REINFORCING ELEMENT FOR REINFORCING A STRUCTURAL ELEMENT

(71) Applicant: SIKA TECHNOLOGY AG, Baar (CH)

(72) Inventors: Robert Davis, Macomb, MI (US); Michael C. Niezur, Southfield, MI (US); Taylor S. Robertson, Oxford, MI (US)

(73) Assignee: SIKA TECHNOLOGY AG, Baar (CH)

( * ) Notice: Subject to any disclaimer, the term of this patent is extended or adjusted under 35 U.S.C. 154(b) by 395 days.

(21) Appl. No.: 18/168,130

(22) Filed: Feb. 13, 2023

(65) Prior Publication Data
US 2024/0270324 A1 Aug. 15, 2024

(51) Int. Cl.
*B62D 29/00* (2006.01)
*B62D 25/00* (2006.01)

(52) U.S. Cl.
CPC ........... *B62D 29/002* (2013.01); *B62D 25/00* (2013.01)

(58) Field of Classification Search
CPC ........ B62D 25/04; B62D 25/00; B62D 25/06; B62D 25/08; B62D 25/20; B62D 29/001; B62D 29/002; B62D 29/004; B29C 44/00; B29C 44/1204; B29C 44/18
USPC .............. 296/193.06, 210, 23.01, 3, 209
See application file for complete search history.

(56) References Cited

U.S. PATENT DOCUMENTS

| 11,180,094 B2 * | 11/2021 | Poch | B62D 29/002 |
| 2004/0201258 A1 * | 10/2004 | Daniere | B62D 29/002 |
| | | | 296/203.02 |
| 2007/0080559 A1 * | 4/2007 | Stolarski | B60J 5/0452 |
| | | | 296/146.6 |

FOREIGN PATENT DOCUMENTS

JP 09108874 A * 4/1997

OTHER PUBLICATIONS

JP09108874 Text (Year: 1997).*

* cited by examiner

*Primary Examiner* — Dennis H Pedder
(74) *Attorney, Agent, or Firm* — Oliff PLC

(57) ABSTRACT

A reinforcing element for reinforcing a structural element in a motor vehicle, the reinforcing element including: a carrier; an expandable material, the expandable material being arranged at least partially on the carrier; at least two fixation elements that are connected with the carrier, the fixation elements each including a circular metallic tab with an essentially flat central section adapted for welding, and the fixation elements being arranged in such a way that the reinforcing element is fixable to the structural element with a weld connection between the tabs and the structural element; wherein the circular metallic tabs are enclosed by material of the carrier; and wherein the fixation elements are arranged in a peripheral area of the carrier.

12 Claims, 5 Drawing Sheets

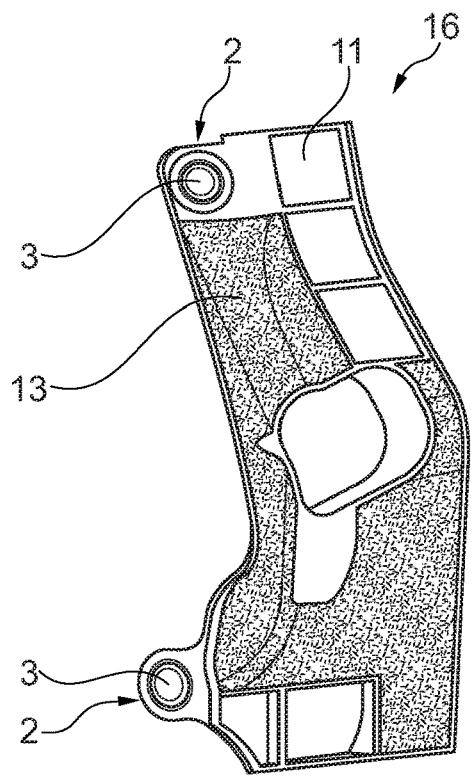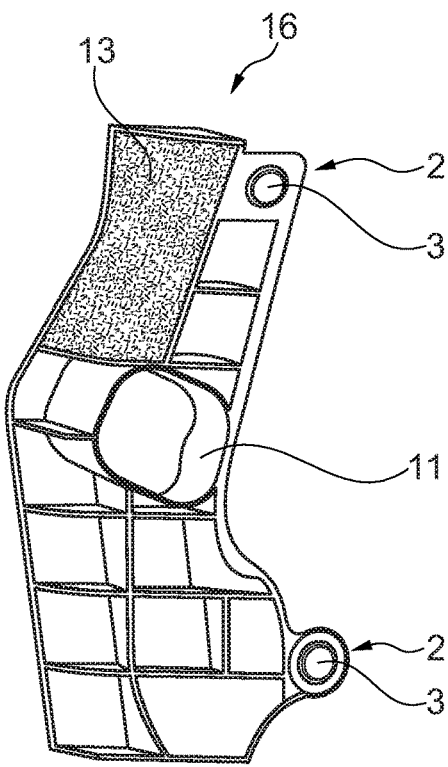
Fig. 4a  Fig. 4b
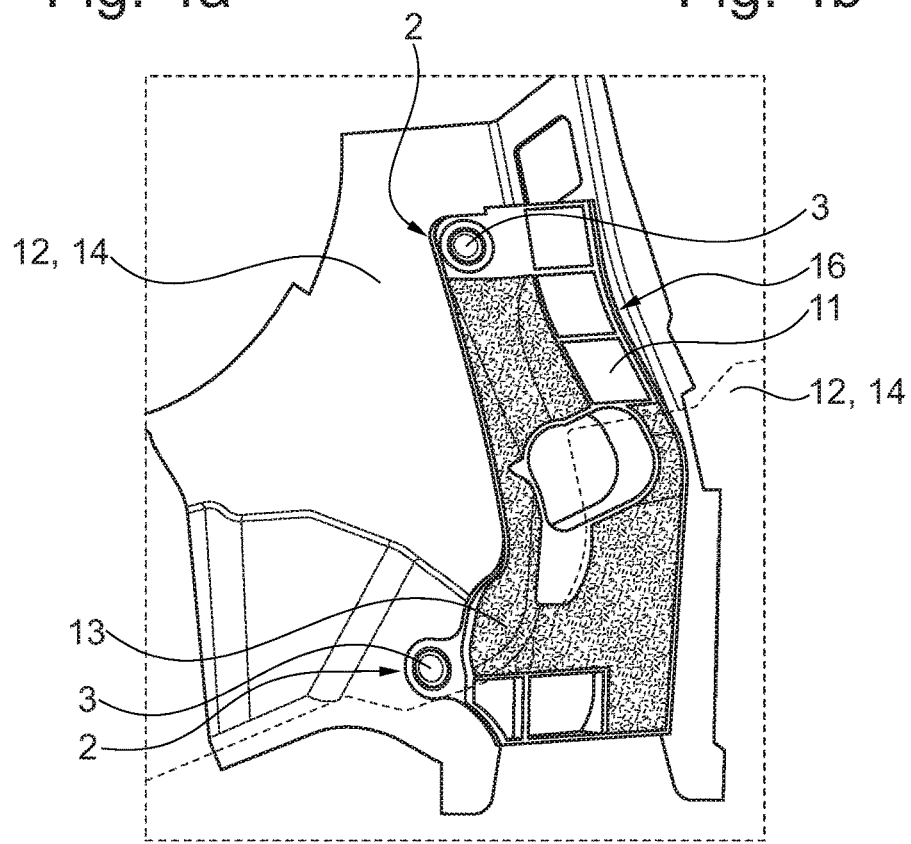
Fig. 4c

REINFORCING ELEMENT FOR REINFORCING A STRUCTURAL ELEMENT

The invention relates to a reinforcing element for reinforcing a structural element and to a system of a reinforced structural element in a motor vehicle.

Components, for example bodies and/or frames of transportation and conveyance means, in particular of aquatic or terrestrial vehicles or of aircraft, frequently have structures with cavities in order to make lightweight constructions possible. However, these cavities cause a wide variety of problems. Depending on the type of the cavity, the latter has to be sealed in order to prevent the ingress of moisture and dirt, which can lead to the corrosion of the components. It is often also desirable to substantially reinforce the cavities, and thus the component, but to retain the low weight. It is often also necessary to stabilize the cavities, and thus the components, in order to reduce noises which would otherwise be transmitted along or through the cavity. Many of these cavities have an irregular shape or tight dimensions, on account of which it becomes difficult to properly seal, reinforce, and damp said cavities.

In particular in automotive construction, but also in aircraft construction and boat building, sealing elements (baffles) are therefore used in order to seal and/or acoustically insulate cavities, or reinforcing elements (reinforcers) are used in order to reinforce cavities.

FIG. 1 schematically illustrates a body of an automobile. In this case, the vehicle body 10 has various structures with cavities, for example pillars 14 and carriers or braces 12. Such structural elements 12, 14 with cavities are usually sealed and/or reinforced, respectively, using sealing and/or reinforcing elements 16.

FIG. 2 schematically illustrates a known concept for reinforcing such structural elements having cavities in motor vehicles. In this example, the expandable material 13 is arranged on surfaces of a carrier element 11. In this exemplary embodiment, the carrier element 11 has an irregularly shaped cross section.

This reinforcing element 16 according to the prior art has weld tabs 15 for fixing the carrier to the structural element with a weld connection.

A drawback of such reinforcing elements 16 is that its weld tabs 15 are exposed, such that they can get damaged during production, transport, or manipulation. Furthermore, this type of weld tabs tends to suffer from less-than-optimal quality and repeatability of production. Another drawback is the limited design options with such weld tabs due to the required integration of the metallic tabs into the polymeric material of the carrier. From this it follows that not all areas of the carrier are eligible for the placement of such tabs.

The invention is therefore based on the object of providing an improved device of the type mentioned at the beginning, which allows the carrier to be connected to the structural element better. In addition, the device should allow ease of design, improved manufacturability, quality and repeatability, as well as better protection against damaging during production, transport and manipulation.

This object is achieved by a Reinforcing element for reinforcing a structural element in a motor vehicle, comprising: a carrier; an expandable material, the expandable material being arranged at least partially on the carrier; at least two fixation elements that are connected with the carrier, the fixation elements each comprising a circular metallic tab with an essentially flat central section adapted for welding, and the fixation elements being arranged in such a way that the reinforcing element is fixable to the structural element with a weld connection between the tabs and the structural element; wherein the circular metallic tabs are enclosed by material of the carrier; and wherein the fixation elements are arranged in a peripheral area of the carrier.

This solution has the advantage that due to the integration of the circular metallic tabs within the material of the carrier, the tabs are protected against mechanic influence. This integration within the material of the carrier further results in an improved moldability and manufacturability, since the position of the tabs is closely defined within the mould forms. Thus, such parts can be produced with better quality and smaller tolerances in the area of the tabs.

A core concept of the invention is that, as a result of the integration of the tabs into the material of the carrier, there is more freedom of design as to the location of the fixation elements (weld tabs), because the location of the tabs is no longer limited to specific suitable areas of the carrier where state of the art weld tabs can be arranged. This allows for more options when designing the part, and ultimately for optimized and higher performing parts.

In one exemplary embodiment, the circular metallic tabs are dome shaped.

This has the advantage that, as a result of this specific shape, during the welding process, a weld tip is guided onto the desired spot for welding.

In one exemplary embodiment, the circular metallic tabs have a border area that lies in a plane, this plane of the border area being shifted parallelly from the plane of the essentially flat central section.

In one exemplary embodiment, the border area of the circular metallic tabs comprises a rim with a constant width all around the tab, this width measuring from 1 mm to 5 mm, advantageously from 2 mm to 4 mm.

This has the advantage that, as a result of such a rim configuration, these circular metallic tabs can be optimally integrated into the material of the carrier.

In one exemplary embodiment, a diameter of the circular metallic tabs measures from 15 mm to 45 mm, advantageously from 20 mm to 40 mm.

In one exemplary embodiment, the carrier and the expandable material are a resulting product from an injection moulding process.

In one exemplary embodiment, the injection moulding process defines a draw direction for the carrier.

In one exemplary embodiment, an axis perpendicular to the essentially flat central section of at least one of the tabs is at an angle of from 2° to 20° to the draw direction of the carrier, advantageously from 5° to 15°.

This has the advantage that, as a result of such possible angles between the draw direction and the axis of the tabs, the reinforcing element can be designed with more freedom, since the orientation of the tabs can be adapted to the corresponding area of the structural element.

In one exemplary embodiment, the carrier builds a flange that encloses at least partially a border area of the circular metallic tabs.

In one exemplary embodiment, the carrier builds a gusset that strengthens a connection between the flange and the rest of the carrier.

This has the advantage that, as a result of such gussets, a mechanical robustness of such tabs can be further increased.

In one exemplary embodiment, the expandable material has an expansion rate of more than 100% and less than 800% in particular more than 200% and less than 700%, in particular more than 250% and less than 600%.

In principle, different types of material can be used as the expandable material. For example, the following commercially available adhesives can be used: SikaReinforcer®-911, SikaReinforcer®-940, SikaReinforcer®-941, SikaReinforcer®-942, SikaReinforcer®-943, SikaReinforcer®-951 and SikaReinforcer®-955.

In one exemplary embodiment, the expandable material is curable by a temperature of more than 120°.

In one exemplary embodiment, the carrier has been produced with the expandable material arranged respectively thereon by a two-component injection-moulding process.

This has the advantage that, as a result, cost-effective devices can be produced.

In one exemplary embodiment, the carrier contains plastic, fibre-reinforced plastic (in particular carbon-fibre-reinforced plastic or glass-fibre-reinforced plastic), or a combination of these materials.

The object set at the beginning is also achieved by a system of a reinforced structural element in a motor vehicle, wherein the system comprises: a structural element; a reinforcing element as described above, wherein the reinforcing element is arranged in the structural element; wherein the expanded material connects the carriers to the structural element.

Details and advantages of the invention will be described in the following text on the basis of exemplary embodiments and with reference to schematic drawings, in which:

FIGS. 3a to 4c show schematic illustrations of an exemplary reinforcer element;

Figure 1:
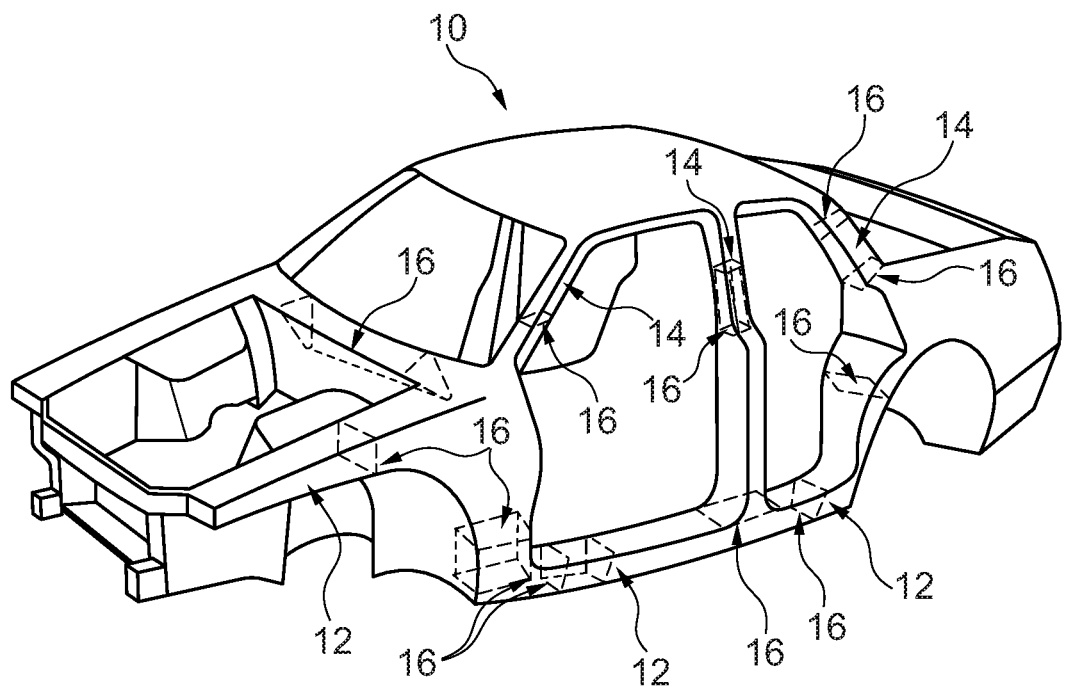
FIG. 1 shows an exemplary illustration of a vehicle body.
Figure 2:
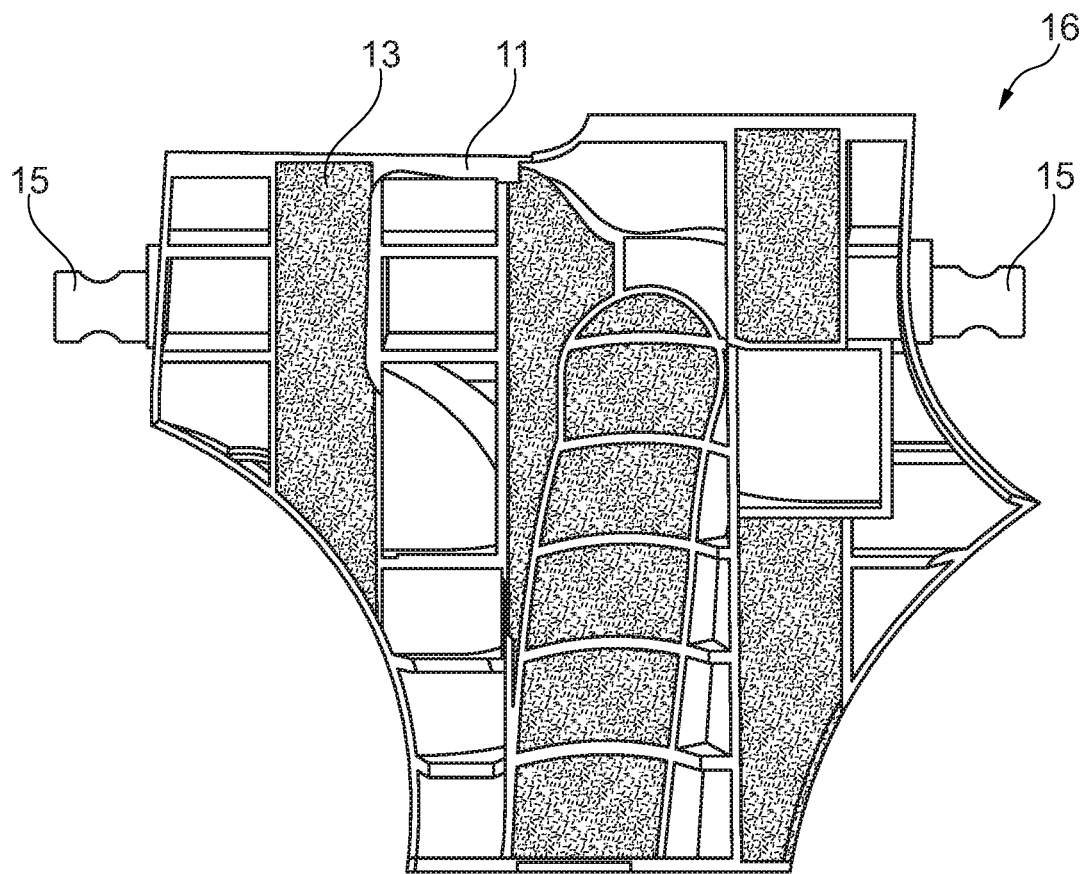
FIG. 2 shows a schematic illustration of an exemplary reinforcer element according to the prior art.
Figure 3A:
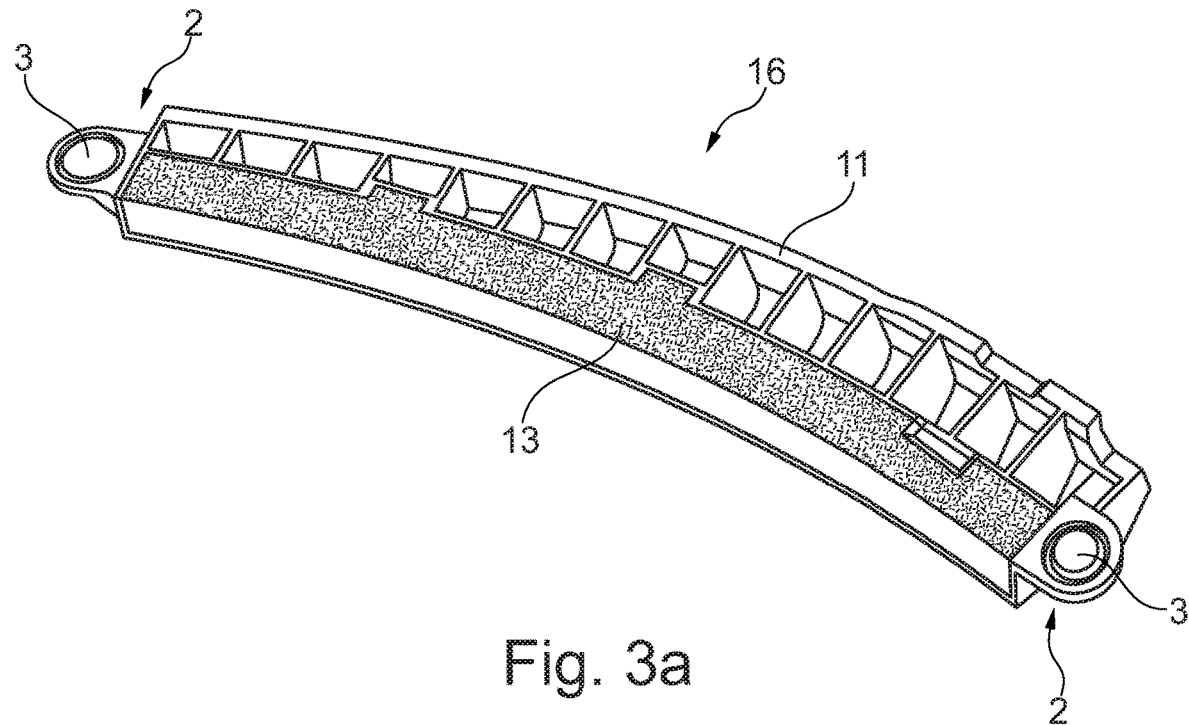
Figure 3B:
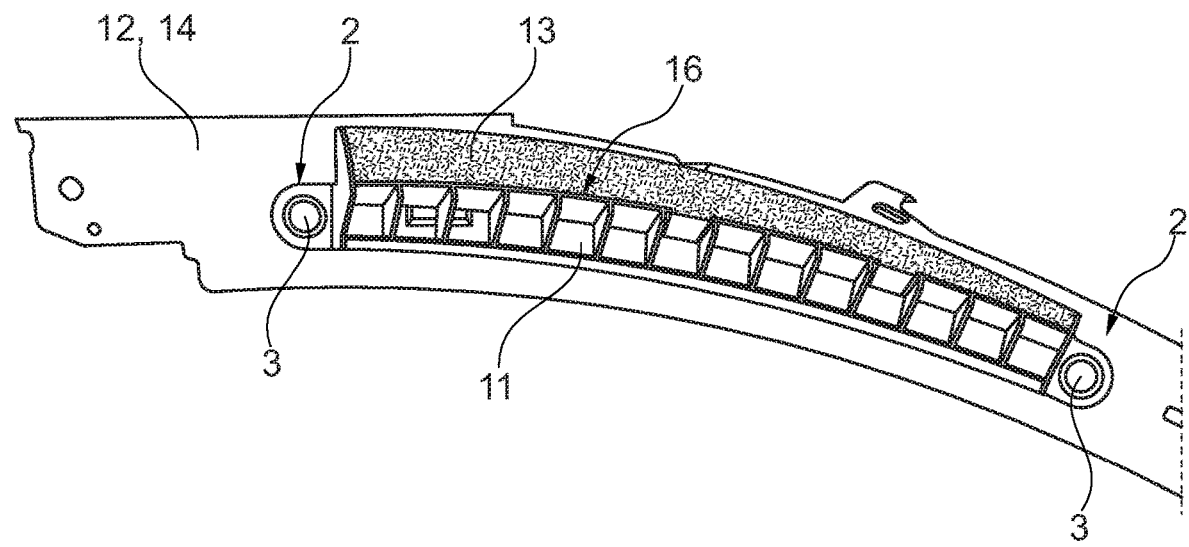

FIGS. 3a and 3b illustrate a first exemplary embodiment of a reinforcing element 16. In this case, FIG. 3a shows a first side of the reinforcing element 16. FIG. 3b shows another side of the reinforcing element 16, which is essentially opposite the first side shown in FIG. 3a.

Furthermore, in FIG. 3b, the reinforcing element 16 is fastened to a structural element 12, 14 by means of weld connections.

In this exemplary embodiment, the reinforcing element 16 has an elongate shape, and comprises a carrier 11 with thereon arranged expandable material 13. At both ends of the carrier 11, the reinforcing element 16 has fixation elements 2. Each of these fixation elements 2 has a circular metallic tab 3 that is enclosed by material of the carrier 11.

FIGS. 4a and 4b illustrate a second exemplary embodiment of a reinforcing element 16. In this case, FIG. 4a shows a first side of the reinforcing element 16, and FIG. 4b shows a second side, which is essentially opposite the first side. In FIG. 4c, the reinforcing element 16 is arranged in a structural element 12, 14, and fastened to one side of the structural element 12, 14 by means of weld connections.

Figure 5A:
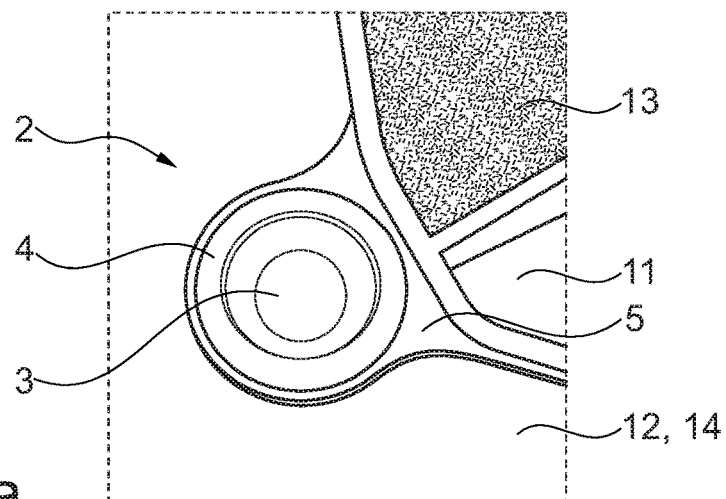
FIGS. 5a to 5c show schematic illustrations of an exemplary fixation element.
Figure 5B:
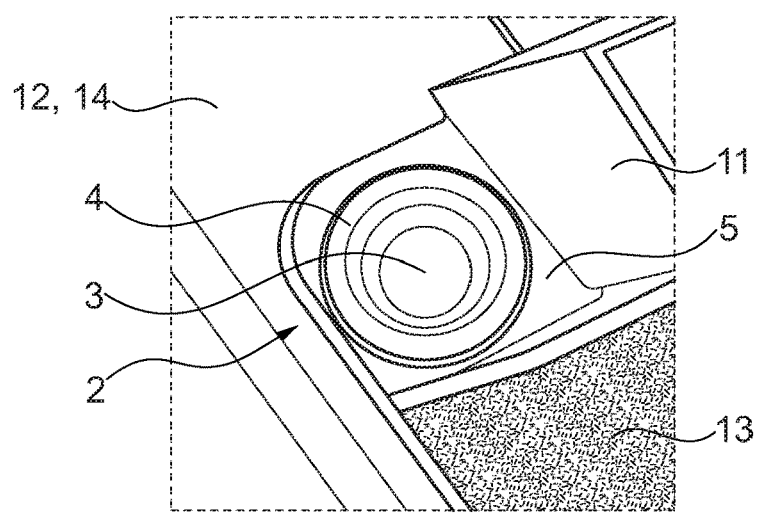
Figure 5C:
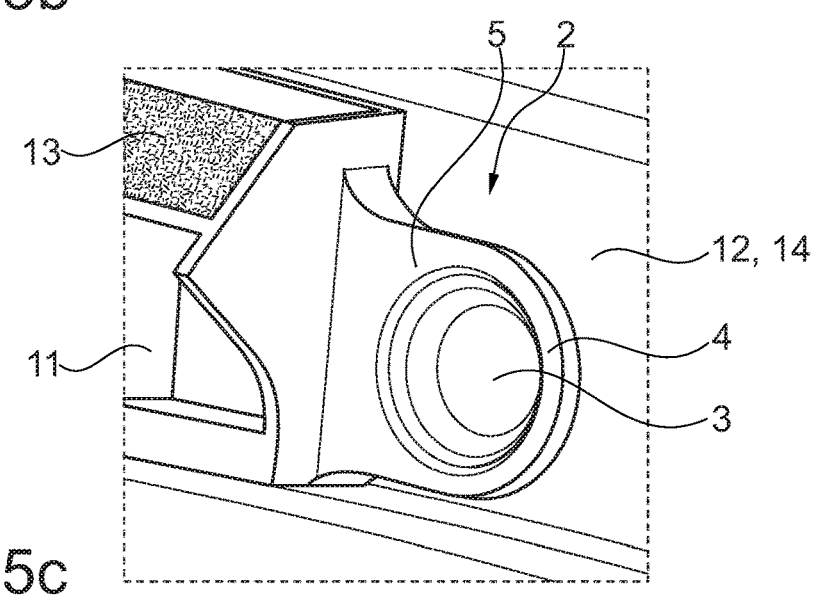

FIGS. 5a to 5c different exemplary embodiments of fixation elements 2 are illustrated. Each of the fixation elements 2 comprises a circular metallic tab, which is enclosed with a flange 4 of material of the carrier 11. Furthermore, the fixation elements 2 comprise gussets 5, also of material of the carrier 11, that mechanically reinforce the fixation elements 2.

Figure 6A:
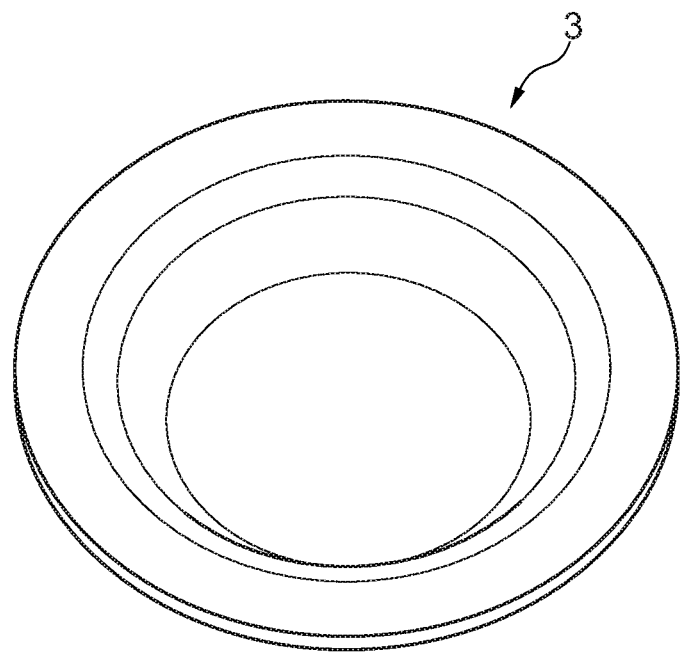
FIGS. 6a and 6b show schematic illustrations of an exemplary circular metallic tab.

FIG. 6a illustrates in more detail an exemplary circular metallic tab 3. The tab 3 is dome shaped and has an essentially flat central section. A border area of the tab lies in a plane, this plane of the border area being shifted parallelly from the plane of the essentially flat central section. The border area of the circular metallic tab comprises a rim with a constant width all around the tab.

Figure 6B:
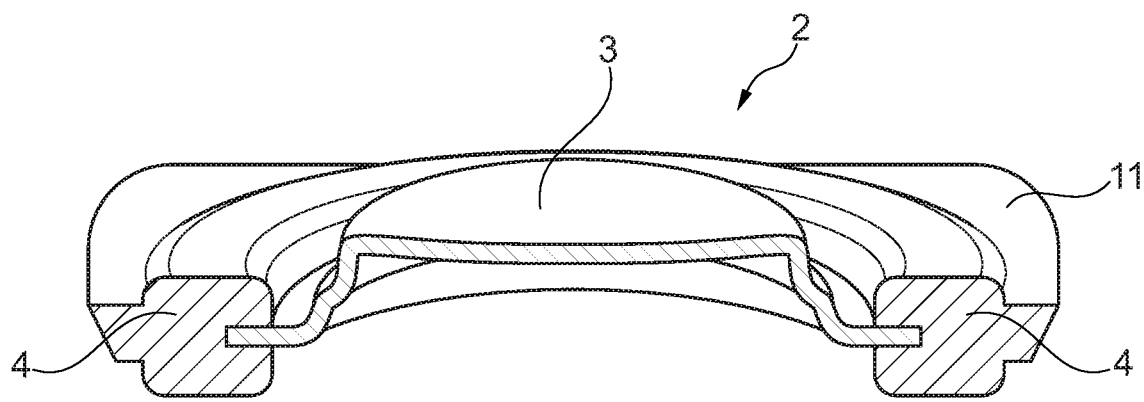

FIG. 6c illustrates a cross-section of the circular metallic tab 3 from FIG. 6, which is enclosed in a flange 4 of material of the carrier 11. The flange 4 encloses at least partially the rim of the dome shaped circular metallic tab 3.

LIST OF REFERENCE SIGNS 1 system
2 fixation element
3 circular metallic tab
4 flange
5 gusset
10 vehicle body
11 carrier
12 structural element
13 expandable material
14 structural element
15 weld tab
16 reinforcing element

The invention claimed is:

1. A reinforcing element for reinforcing a structural element in a motor vehicle, comprising:
   a carrier;
   an expandable material, the expandable material being arranged at least partially on the carrier;
   at least two fixation elements that are connected with the carrier, the fixation elements each comprising a circular metallic tab with an essentially flat central section adapted for welding, and the fixation elements being arranged in such a way that the reinforcing element is fixable to the structural element with a weld connection between the tabs and the structural element;
   wherein the circular metallic tabs are dome shaped and are enclosed by material of the carrier; and
   wherein the fixation elements are arranged in a peripheral area of the carrier.

2. The reinforcing element according to claim 1, wherein the circular metallic tabs have a border area that lies in a plane, this plane of the border area being shifted parallelly from the plane of the essentially flat central section.

3. The reinforcing element according to claim 2, wherein the border area of the circular metallic tabs comprises a rim with a constant width all around the tab, this width measuring from 1 mm to 5 mm.

4. The reinforcing element according to claim 1, wherein a diameter of the circular metallic tabs measures from 15 mm to 45 mm.

5. The reinforcing element according to claim 1, wherein the carrier and the expandable material are a resulting product from an injection moulding process.

6. The reinforcing element according to claim 5, wherein the injection moulding process defines a draw direction for the carrier.

7. The reinforcing element according to claim 6, wherein an axis perpendicular to the essentially flat central section of at least one of the tabs is at an angle of from 2° to 20° to the draw direction of the carrier.

8. A reinforcing element for reinforcing a structural element in a motor vehicle, comprising:
   a carrier;
   an expandable material, the expandable material being arranged at least partially on the carrier;

at least two fixation elements that are connected with the carrier, the fixation elements each comprising a circular metallic tab with an essentially flat central section adapted for welding, and the fixation elements being arranged in such a way that the reinforcing element is fixable to the structural element with a weld connection between the tabs and the structural element;

wherein the circular metallic tabs are enclosed by material of the carrier and the carrier builds a flange that encloses at least partially a border area of the circular metallic tabs; and wherein the fixation elements are arranged in a peripheral area of the carrier.

9. The reinforcing element according to claim 8, wherein the carrier builds a gusset that strengthens a connection between the flange and the rest of the carrier.

10. The reinforcing element according to claim 1, wherein the expandable material has an expansion rate of more than 100% and less than 800%.

11. A system of a reinforced structural element in a motor vehicle, the system comprising:
a structural element;
a reinforcing element according to claim 1, wherein the reinforcing element is arranged in the structural element;
wherein the expanded material connects the carrier to the structural element.

12. The reinforcing element according to claim 8, wherein the circular metallic tabs are dome shaped.

* * * * *